Oct. 9, 1962 R. GENTILE ETAL 3,057,516
FILM MOUNT TRANSPORT MECHANISM
Filed Nov. 21, 1960 3 Sheets-Sheet 1

RALPH GENTILE
RALPH E. KLAUSS
INVENTORS
BY
ATTORNEYS

RALPH GENTILE
RALPH E. KLAUSS
INVENTORS

ATTORNEYS

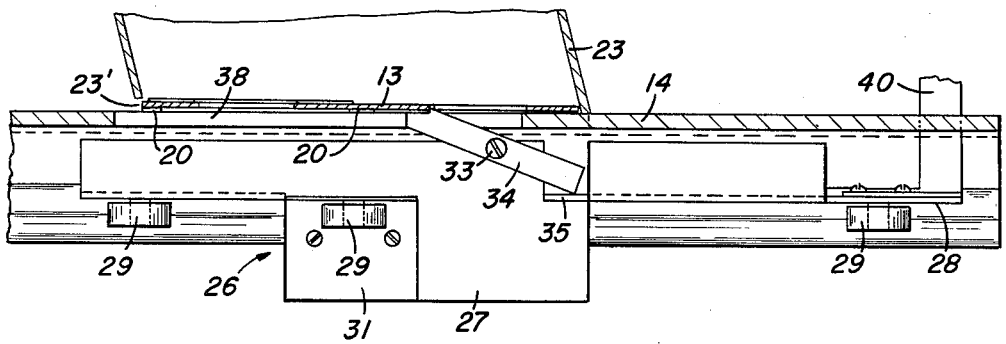
Fig. 5
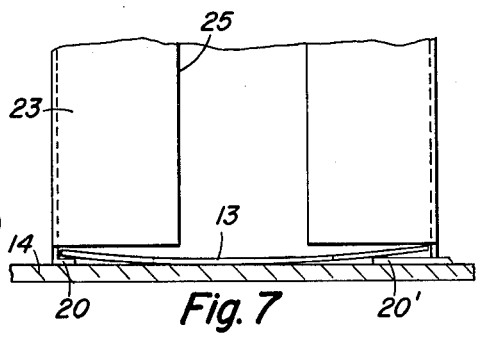
Fig. 7
Fig. 8
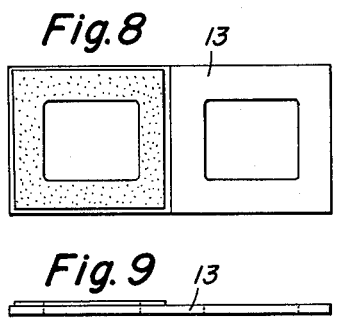
Fig. 9
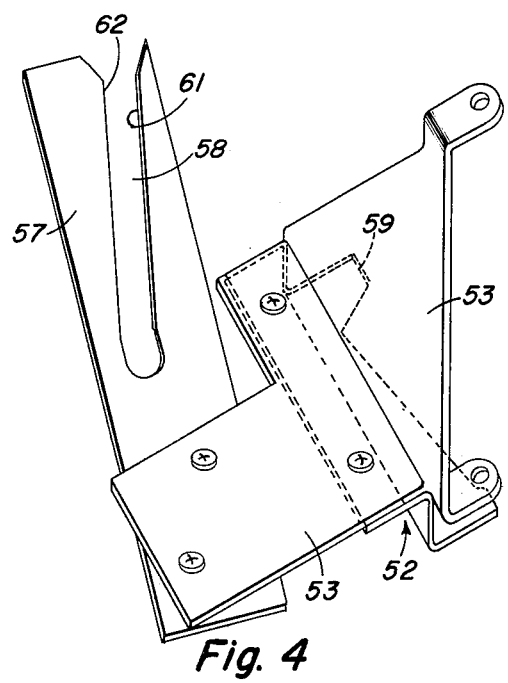
Fig. 4
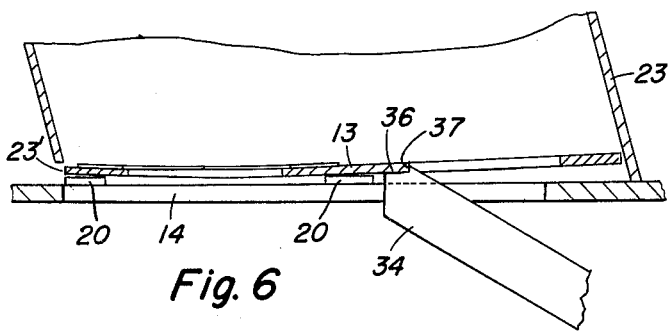
Fig. 6
RALPH GENTILE
RALPH E. KLAUSS
INVENTORS
BY
ATTORNEYS

# United States Patent Office 3,057,516
Patented Oct. 9, 1962

3,057,516
FILM MOUNT TRANSPORT MECHANISM
Ralph Gentile and Ralph E. Klauss, Rochester, N.Y., assignors to Eastman Kodak Company, Rochester, N.Y., a corporation of New Jersey
Filed Nov. 21, 1960, Ser. No. 70,700
10 Claims. (Cl. 221—236)

This invention relates generally to transport mechanisms, and more specifically to an improved film mount transport mechanism for successively transporting film mounts to a transparency receiving position.

A need has existed in the photofinishing industry, particularly with respect to the small photofinishers, for a simple and inexpensive large-capacity film mount transport mechanism for successively transporting film mounts to a transparency receiving position where they receive a transparency which is tacked thereto. The film mount for receiving the transparency is of a conventional type formed from a single piece of cardboard which is scored along its center line to provide two hinged flaps adapted to be sealed in overlapped relation with the transparency positioned or sandwiched therebetween. Two flaps are provided with registering apertures which are of sufficient size to frame the image area of the transparency. The balance of the transparency extends beyond the edges of the apertures and is surrounded by an adhesive spacer element secured to the marginal edges of one of the flaps. The flaps are of larger dimension than the transparency so as to extend beyond all sides of the latter as is well known. When film transparencies are mounted in a film mount of the foregoing type, it is necessary to tack the transparency in the transparency receiving area framed by the spacer element before the mount is folded and sealed. The tacking is necessary to assure that the entire picture-bearing area of the transparency is viewable through the apertures and to eliminate the possibility of an undesirable portion of the transparency beyond the picture area appearing in the aperture viewing area. The tacking also eliminates any possible twisting or skewing of the transparency prior to sealing which would otherwise result in improper orientation of the transparency with respect to the apertures.

A difficulty experienced with film mount transport mechanisms in the past has been their tendency to jam because of the edges of the apertures of the transported film mount interlocking or snagging on the edges of the apertures of the stationary adjacent film mount which remains in the film mount hopper. All of the successfully operating film mount transport mechanisms of a semi-automatic or automatic nature of which applicants are aware are extremely complicated and expensive. For that reason, most of them are out of the reach of the small photofinisher who must then rely on transparency mounting mechanisms in which the operator manually feeds in the film mounts one at a time. This, of course, is tedious and time-consuming.

Therefore, one of the primary objects of the present invention is to provide an improved large-capacity film mount supply and transport mechanism for successively transporting film mounts from a stock to a transparency receiving position.

Another object of the invention is the provision of an improved film mount transport mechanism that is of simple design and construction, thoroughly reliable and efficient in operation, and economical to manufacture.

Still another object of this invention is to provide an improved film mount transport mechanism that eliminates the tendency of the mechanism to jam as a result of the edges of the apertures of the transported film mount interlocking or snagging on the edges of the apertures of the adjacent stationary film mount which remains in the film mount hopper.

A further object of the invention is the provision of an improved film mount transport mechanism having a novel film mount support means permitting the mechanism to transport bent film mounts without jamming the mechanism.

A more specific object of this invention is the provision of an improved large-capacity film mount supply and transport mechanism in which the slide to be transported to a transparency receiving position is initially tilted with respect to the remaining film mounts in the hopper, and then transported to the transparency receiving position.

Objects and advantages other than those set forth above will be apparent from the following description when read in connection with the accompanying drawings, in which:

FIG. 4 is a perspective view of the film mount shifting mechanism;

FIG. 5 is a side elevation view of the carriage and film mount advancing pawl;

FIG. 6 is an enlarged view of a portion of FIG. 5;

FIG. 7 is a segmental front elevation view of the film mount hopper showing how a bent film mount is supported by the support means;

FIG. 8 is a top plan view of a film mount; and

FIG. 9 is a side elevation view of the film mount of FIG. 8.

Figure 1:
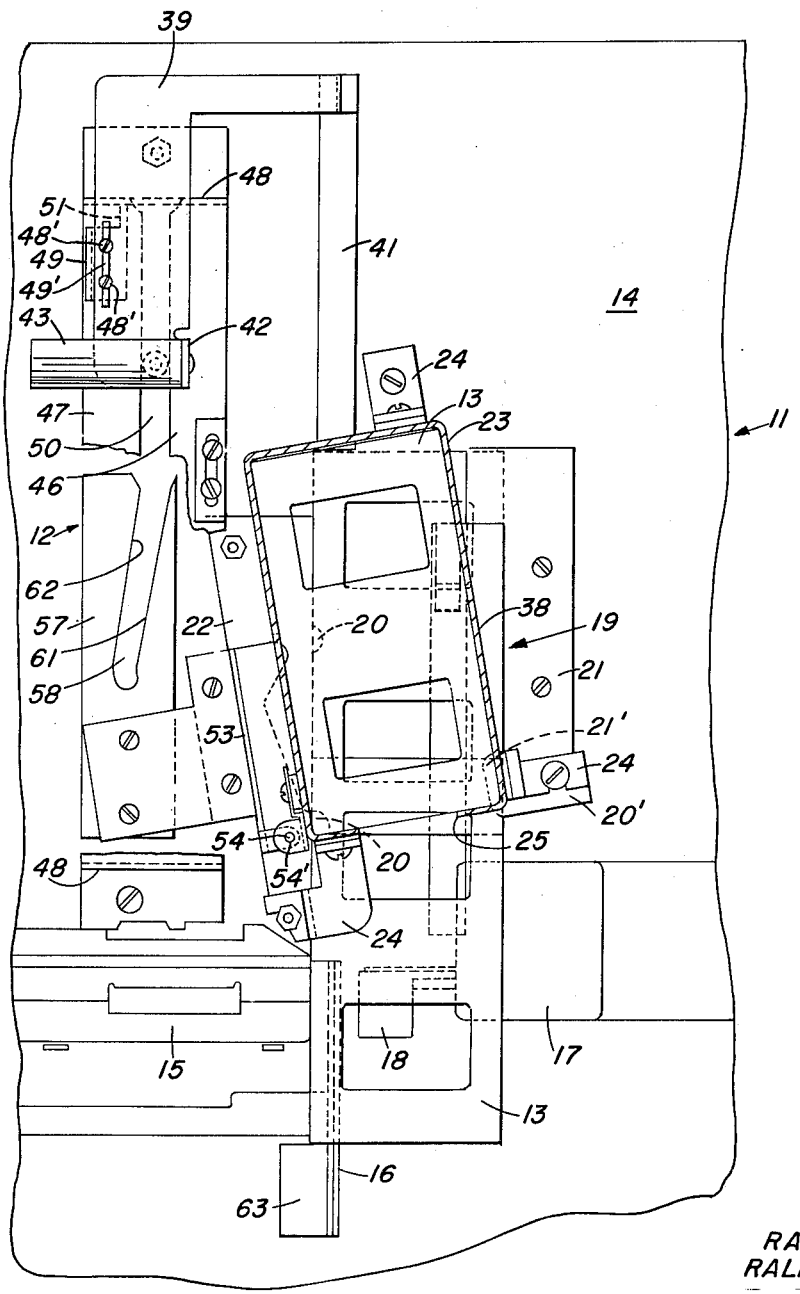
FIG. 1 is a segmental top plan view of a preferred embodiment of the film mount transport mechanism of this invention showing the mechanism in a "rest" position from which it is moved to transport a film mount to a transparency receiving position.

As shown in the drawings, this invention is embodied in a slide mounting machine 11 although it should be understood that the film mount transport mechanism 12 incorporated therein can be used equally well in other applications. The film mount transport mechanism 12 is adapted to successively feed film mounts 13 to a transparency receiving position in which a transparency, not shown, is positioned in the transparency receiving area of each film mount 13 and tacked thereto. The slide mounting machine 11 includes a base plate 14 having a film gate mechanism 15 mounted thereon for guiding and directing a filmstrip, not shown, over the transparency receiving area of film mount 13. A knife mechanism 16 is mounted at the end of film gate 15 and cooperates therewith to sever a transparency from the film strip and deposit it in the transparency receiving area of film mount 13. A tacking mechanism 17 is also supported by base plate 14 and has a heated end 18 adapted to tack the severed transparency to film mount 13. Since film gate, knife and tacking mechanisms 15, 16 and 17 respectively may be of any known type, and form a part of the invention only in that they show the environment in which the invention operates, they will not be described in detail but only referred to generally.

A guideway 19 for guiding and directing the film mounts 13 into a transparency receiving position comprises guide members 21, 22 which are spaced apart a sufficient distance to slidably guide a film mount 13 therebetween at right angles to the direction of travel of the film strip, not shown. Guide member 21 is triangularly shaped and has a pair of stepped-down spaced tabs 20, shown best in FIGS. 1 and 2 extending into guideway 19 for supporting a film mount at two points. The distance between the upper surface of member 22 and upper surfaces of tabs 20 is approximately equal to the thickness of a film mount. Another film mount support member 20' is mounted on base 14 and has a portion 21' extending into guideway 19. Tabs 20 and portion 21' extend above the level of guideway 19 and form a three point suspension system or support for film mounts 13. With a support of this type, there is no tendency for the mount to shift its position placing one corner or edge thereof further above base 14. Without such a support, bent film mounts will tend to contact base 14 along a line or point and in such an unstable position may pivot about such line or point placing one corner or edge thereof a further distance above base 14 than other parts of the mount. This is disadvantageous since the corner or edge may catch along a lower edge of a large-capacity film mount supply hopper 23 instead of passing through a slot of a predetermined height between base 14 and the lower edge of hopper 23. The slot is limited in its height and must necessarily be slightly greater than the thickness of a film mount to permit passage of a mount therethrough, but must not exceed the thickness of two film mounts or else two mounts may be transported therethrough, which is undesirable. By providing a slot 23' as seen in FIGS. 6 and 7, in which the distance between the upper surfaces of tabs 20 and portion 21' and the lower edge of hopper 23 are equal to the predetermined height, a large portion of the bend in the mount is absorbed in the space between base 14 and the upper surface of tabs 20 and portion 21'.

Figure 2:
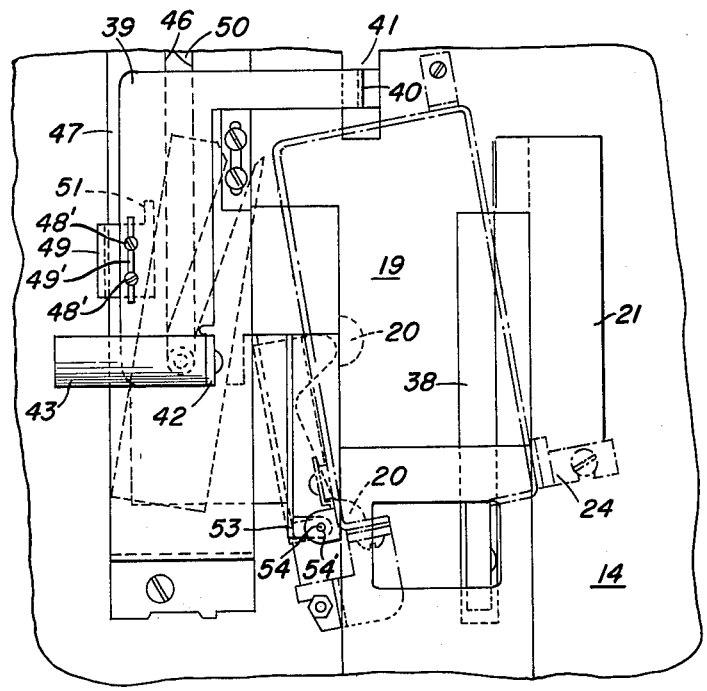
FIG. 2 is a view similar to FIG. 1 with the hopper shown in broken lines, and further showing the mechanism at the completion of its transport movement in which the film mount is moved into its transparency receiving position.

The hopper 23 comprises an elongated open-ended box-like member for receiving a stack of opened film mounts 13 as seen in FIG. 1. The hopper 23 is mounted on base 14 by brackets 24 and is inclined toward the transparency-receiving position at an angle of approximately 15 degrees from the vertical as seen best in FIGS. 5 and 6. By inclining hopper 23, the center of gravity of the stack of film mounts 13 is moved toward the transparency-receiving position and the weight of the film mounts 13 tends to urge the leading end of the lowermost film mount against tabs 20 and portion 21', and further causes the film mounts 13 to lie substantially flat in hopper 23. Also, the mounts 13 lie in hopper 23 in a shingled relation, and the apertures in mounts 13, particularly the lowermost ones in the hopper, are not in register hereby minimizing the possibility of sliding interferences between adjacent mounts. As indicated earlier, the film mounts 13 are each formed from a single piece of cardboard scored long its center line to provide two hinged flaps which are adapted to be arranged in overlapped relation with the transparency sandwiched therebetween. The flaps are provided with registering apertures, and one aperture is surrounded by a spacer element and accordingly is thicker than the other flaps as seen in FIGS. 8 and 9. If a stack of mounts 13 are placed in a vertical hopper, the thicker flaps build up more rapidly than the other flaps resulting in the film mounts assuming a position inclined with respect to base 14, and the mounts do not urge the leading end of the lowermost film mount against plate 14 with the same force as where an inclined hopper is used. The hopper 23 is further turned with respect to guideway 19 at an angle of approximately 10 degrees as seen in FIGS. 1 and 2. This serves to eliminate any tendency of the mechanism to jam, a condition which might occur should the edges of the apertures of a film mount transported along guideway 19 interlock or snag on the edges of the apertures of the adjacent stationary film mount which remains in the hopper. The front side of hopper 23 has a slot 25 extending throughout its entire length as best seen in FIGS. 1 and 3 so that the operator can observe the stack of film mounts 13 and can manually handle them for loading and unloading.

Figure 3:
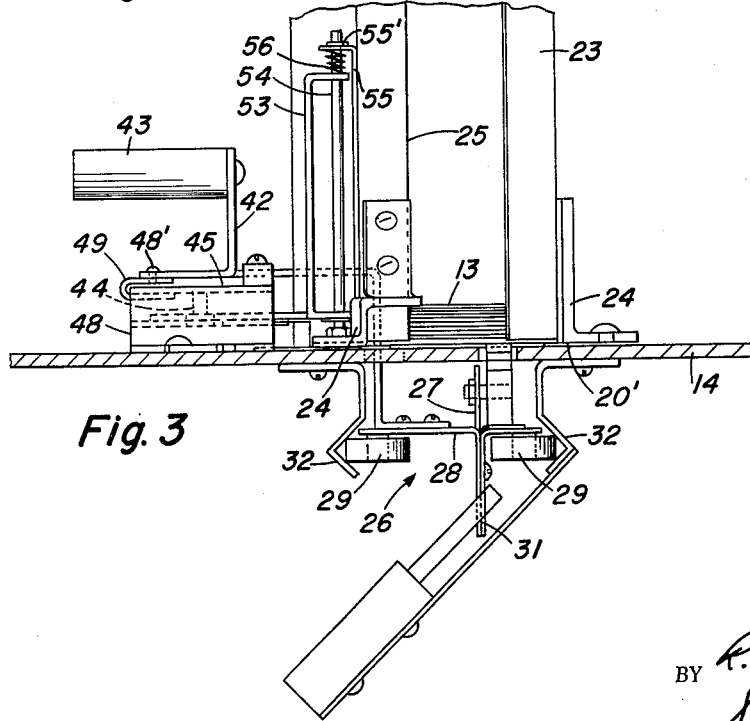
FIG. 3 is a front elevation view of the structure of FIG. 2.

The film mount transport mechanism 12 includes a carriage 26 seen best in FIGS. 3 and 5 comprising a plate member 27 having bent-over tabs 28 at each end at right angles to plate 27 for supporting rollers 29. An L-shaped bracket 31 is secured to plate 27 intermediate its ends and extends from plate 27 in a direction opposite to that of tabs 28 and also supports a roller 29. A pair of spaced-apart V-shaped guide rails 32 are secured to the underside of base 14 for slidably receiving rollers 29 and supporting carriage 26. The plate 27 is further provided with a stud 33 upon which a film mount engaging pawl 34 is pivotally mounted as seen in FIG. 5. The pawl 34 is designed so that its trailing end is heavier than its leading end, and due to gravity drops down into engagement with a stop lug 35 struck out of plate 27. The leading end of pawl 34 has a lip 36 which remains under film mount 13, and a shoulder 37 for engaging an edge of one of the apertures of film mount 13 for transporting same as seen in FIGS. 5 and 6. The base 14 is provided with an elongated slot 38 in guideway 19 and pawl 34 extends through slot 38 with its shoulder 37 extending above the level of the top of base 14. The carriage 26 is reciprocally movable by a bracket 39, one end 40, of which extends through an elongated slot 41 in base 14 and is secured to one of the tabs 28. The opposite end of bracket 39 has an upturned portion 42 to which a handle 43 is secured as seen in FIGS. 1, 2 and 3. The bracket 39 is supported for reciprocal movement by a depending cylindrical nylon member 44 secured thereto having a peripheral groove 45 shown dotted in FIG. 3 for receiving the edges 46 of a slot 50 formed by support element 47. The support element 47 has depending end portions 48 securing element 47 to base 14 and spacing it therefrom to provide room for member 44. A U-shaped guide element 49 is adjustably secured to bracket 39 by means of screws 48' extending through a slot 49' in bracket 39, and is provided with a finger 51 adapted to engage one of the end portions 48 for stopping bracket 39 in one direction. The bracket 39 is limited in its opposite direction of travel by member 44 engaging the end of a slot 58 as seen in FIG. 2 formed by a cam follower 57.

The shifting mechanism 52 for shifting the bottommost film mount 13 from hopper 23 into guideway 19 comprises an L-shaped bracket 53 pivotally mounted on a rod 54 as seen in FIG. 3. The rod 54 passes loosely through openings 54' in a support member 55 secured to hopper 23, and rod 54 is held onto member 55 by retaining rings 55', only one of which is shown. A spring 56 encircling rod 54 is interposed between member 55 and bracket 53 for urging bracket 53 toward base 14. The cam follower 57 and a pusher element 59 are secured to bracket 53, and pusher element 59 bears against guide member 22 and is of a thickness slightly less than the thickness of a film mount 13. Three sides of hopper 23 have cut-out portions at their end adjacent base 14 to provide space 23' as seen in FIG. 6 between base 14 and hopper 23 through which pusher element 59 may be moved to tilt a film mount 13 from hopper 23 into guideway 19, and through which the transported film mount 13 may be moved along guideway 19 into its operating position. The lower end of member 44 acts as a cam which is adapted upon forward movement of transport mechanism 12 to engage edge 61 of slot 58 of cam follower 57 and pivot bracket 53 causing pusher element 59 to engage the lowermost film mount 13 and tilt it through an angle of approximately 10 degrees into guideway 19. Upon the return movement of transport mechanism 12, the cam engages the opposite edge 62 of cam follower 57 returning cam follower 57 and bracket 53 to its original position.

In the operation of this invention, let us assume initially that transport mechanism 12 is in the position shown in FIG. 1, and that hopper 23 is filled with a supply of film mounts 13, but no film mount is in guideway 19. Upon forward movement of film transport mechanism 12 by handle 43, cam follower 57 and bracket 53 are pivoted causing pusher element 59 to urge the lowermost film mount 13 from hopper 23 into guideway 19 into the dotted position seen in FIG. 1. Since there had not been a previous film mount in guideway 19, no film mount 13 will be advanced by shoulder 37 into the operating position. Upon return movement of transport mechanism 12, tilting mechanism 52 and pusher element 59 are withdrawn from hopper 23, and the leading end of the pawl 34 is forced downwardly by film mount 13 in guideway 19. When transport mechanism 12 reaches the position shown in FIG. 1, gravity forces the leading end of pawl 34 up causing lip 36 to engage the underside of film mount 13 adjacent the edge of one of the apertures. This automatically positions shoulder 37 in position to engage the aperture edge for transporting positioned film mount 13 to the transparency receiving position as seen in FIGS. 5 and 6. Now if transport mechanism 12 is advanced again, shoulder 37 will engage the aperture edge of film mount 13 in guideway 19 and transport it toward its transparency receiving position. When the transport mechanism has advanced the film mount approximately three-fourths of the way toward its transparency receiving position, member 44 engages cam follower 57, and as the transport movement is completed, pivots cam follower 57 and pusher element 59 tilting the lowermost film mount 13 from hopper 23 into guideway 19. At the completion of the forward movement of transport mechanism 12, shoulder 37 has pushed film mount 13 against a stop member 63 and into its transparency-receiving position as seen in full lines in FIG. 1. The filmstrip, not shown, is advanced and a transparency severed therefrom, and tacked to the transparency receiving area of film mount 13. The operator is then ready to return transport mechanism 12 to its initial starting position and transport a new film mount 13 into the transparency-receiving position.

The invention has been described in detail with particular reference to a preferred embodiment thereof, but it will be understood that variations and modifications can be effected within the spirit and scope of the invention as described hereinabove and as defined in the appended claims.

We claim:

1. In a transport mechanism for transporting apertured film mounts and the like, the combination comprising: means forming a guideway; means for transporting a film mount along said guideway from a first position to a second position where said mount is acted upon; means for holding a plurality of film mounts in stacked relation with at least the lowermost mount disposed at an angle with respect to said guideway and lying in a plane substantially parallel to the plane of said guideway; means for shifting the lowermost film mount from said holding means into said first position in said guideway and parallel thereto, and means coordinating movement of said shifting means and transporting means whereby said lowermost mount is moved to said first position as the preceding mount is moved from said first position to said second position.

2. The invention according to claim 1 wherein said transport means comprises a reciprocally movable carriage carrying a pawl adapted to engage the edge of an aperture of a film mount in said first position for advancing same to said second position.

3. The invention according to claim 2 wherein the pawl is pivoted and the pivot of said pawl is located so that the trailing end of said pawl is heavier than its leading end and is urged by gravity into engagement with a stop lug formed by said carriage thereby locating the leading end in position to engage the edge of an aperture in the film mount located in the first position in said guideway upon advance of said transport means.

4. The invention according to claim 3 wherein said leading end of said pawl has a lip adapted to engage the underside of the film mount, said lip terminating in a shoulder adapted to engage the edge of the film mount aperture.

5. The invention according to claim 1 wherein said transport means is reciprocally movable and carries a cam, and said shifting means comprises a pivotal film mount engaging member having a slotted cam follower actuable by said cam for pivoting said film mount engaging member in a direction to push a film mount from said holding means into said first position of said guideway.

6. The invention according to claim 1 wherein said transport means is reciprocally movable and has a pawl adapted to engage the edge of an aperture of a film mount in said first position for advancing the same to said second position, and further has a cam; and said shifting means comprises a pivotal film mount engaging member having a slotted cam follower actuable by said cam for pivoting said film mount engaging member in a direction to push a film mount from said holding means into said first position of said guideway in timed relation to the advance of a film mount from said first position to said second position.

7. The invention according to claim 1 wherein a plurality of projections are positioned at spaced positions along the guideway for supporting a film mount as spaced points along its edge.

8. The invention according to claim 1 wherein said holding means comprises an elongated hopper having a lower open end secured to said base, at least two adjacent edges of which are spaced from said base by a distance slightly greater than the thickness of said mounts and being inclined toward said second position with respect to a vertical reference line whereby said mounts lie in said hopper in a shingled relation with the apertures in successive mounts out of alignment with one another, and the weight of said mounts forcing the leading edge of the lowermost mount toward said base.

9. In a transport mechanism for transporting apertured film mounts and the like, the combination comprising: means forming a guideway for guiding movement of a film mount located in said guideway from a first position to a second position therein where said mount is acted upon; a reciprocally movable carriage supported by said base and having a pawl adapted to engage the edge of an aperture of a film mount located in said first position for advancing same to said second position; a transport member connected to said carriage for reciprocally moving said carriage, said transport member further having a cam; an elongated film mount hopper mounted on said base and tilted with respect to said guideway for holding a plurality of film mounts in stacked relation and with the mounts disposed in planes substantially parallel to the plane of said guideway and at an angle with respect to said guideway, and a pivotal shifting member carried by said transport mechanism adjacent said hopper and having a film mount engaging element and a slotted cam follower actuable by said cam upon movement of said transport member for pivoting said film mount engaging element in a direction to force a film mount from said hopper into said first position of said guideway as the preceding film mount is advanced by said pawl from said first position to said second position.

10. The invention according to claim 9 wherein said carriage is supported below said base, and said pawl extends through a slot in said guideway for engaging a film mount therein.

References Cited in the file of this patent

UNITED STATES PATENTS

| | | |
|---|---|---|
| 1,292,619 | Lorenz | Jan. 28, 1919 |
| 1,633,588 | Klinenberg | June 28, 1927 |
| 2,539,652 | Amberg et al. | June 30, 1951 |
| 2,827,201 | Kingsley | Mar. 18, 1958 |
| 2,850,961 | Rettig | Sept. 9, 1958 |